United States Patent [19]

Ruiz

[11] Patent Number: 5,379,893
[45] Date of Patent: Jan. 10, 1995

[54] ATTACHE CASE HOUSING LAPTOP COMPUTER

[76] Inventor: Armando Ruiz, 5825 Collins Ave., Apt. 12E, Miami Beach, Fla. 33140

[21] Appl. No.: 151,934

[22] Filed: Nov. 15, 1993

[51] Int. Cl.⁶ .................................................. B65D 3/02
[52] U.S. Cl. .................................. 206/320; 190/900
[58] Field of Search ........................ 206/320; 190/900

[56] References Cited

U.S. PATENT DOCUMENTS

| | | | |
|---|---|---|---|
| 4,483,427 | 11/1984 | Gerch | 190/900 |
| 4,796,735 | 1/1989 | Horiuchi | 190/900 |
| 4,837,590 | 6/1989 | Sprague | 190/900 |
| 5,010,988 | 4/1991 | Brown | 206/320 X |
| 5,080,206 | 1/1992 | Tawil | 190/900 |
| 5,115,893 | 5/1992 | Terkildsen | 190/900 |
| 5,214,574 | 5/1993 | Chang | 206/320 X |
| 5,226,540 | 7/1993 | Bradbury | 206/320 X |
| 5,242,056 | 9/1993 | Zia et al. | 206/320 X |
| 5,249,653 | 10/1993 | King | 190/900 |

*Primary Examiner*—William I. Price
*Attorney, Agent, or Firm*—Shoemaker & Mattare Ltd.

[57] ABSTRACT

An attache case has a partition whose upper surface supports a laptop or notebook computer. The computer is removably affixed to the partition by hook and loop fasteners or the like, and the fasteners may be easily repositioned or replaced when one upgrades or changes computers. Placement of the computer in the upper half of the case better conceals its existence, and when used, the computer is more accessible because of its elevation.

10 Claims, 3 Drawing Sheets

ATTACHE CASE HOUSING LAPTOP COMPUTER

BACKGROUND OF THE INVENTION

This invention relates generally to luggage, and more particularly to a attache case housing a laptop computer.

A number of inventors have developed briefcases or the like specially adapted to contain a small personal computer such as a notebook or laptop computer. In some designs, the computer is more or less permanently installed in the briefcase, while in others it may be removable. In either case, a special recess or location for the computer may be provided in the bottom half of the briefcase. Quite often, a briefcase is designed to receive a particular type or size of computer; this approach does not provide the user with much flexibility, should he decide to upgrade or replace his computer.

With such cases, to my knowledge, the computer is invariably placed in the bottom half of the briefcase. The upper half is reserved for papers and so on, and may have pockets and/or dividers for this purpose. In the past, the smallest personal computers were sufficiently large and heavy to practically require placement in the bottom half of the briefcase. I have found, however, that it is now possible to design a case which will receive a small computer such as a laptop in the upper half of the case, and that the case can remain stable when the lid is raised, provided that the lid is prevented from opening past vertical.

In this invention, place the computer on top of a fairly rigid partition which is hinged within the case in such a way that when parallel to the inside of the top of the case, the partition leaves sufficient height (at least and inch) for the computer. Optionally, a mouse may also be contained in the same space. Rather than providing a customized recess for a particular computer, I provide a set of adhesive-backed hook and loop ("Velcro") type fastener strips which the user of the case can apply to the top of the partition and bottom of the computer in desired corresponding locations. This provides desirable flexibility, allowing for alteration if the computer is exchanged for another. It also allows one to remove the computer from the briefcase when the case is not needed.

Another advantage of the invention is that it better conceals the computer, at least to the ordinary onlooker, who would expect a computer, if any, to be in the bottom portion of the case.

Finally, a further advantage is that the user has better access to his papers, when the partition is raised, since they may be placed in the bottom half, which is normally closer to him, and therefore more accessible.

SUMMARY OF THE INVENTION

An object of the invention is to improve access to a briefcase-contained computer.

Another object of the invention is to conceal the existence of the computer when it is not in use.

A further object of the invention is to provide an attache case which is not dedicated to use with a single type of computer. But of course, one may custom manufacture the case for a particular computer.

These and other objects are attained by an attache case for housing a laptop computer as described in detail below. The case includes a top and bottom halves interconnected by a hinge, and a carrying handle connected to the bottom half, a pair of folding braces for limiting opening movement of the top half with respect to the bottom half to about 90°. A partition is hingedly connected to the upper half of the case along a hinge line spaced at least an inch from the top of the case, thereby defining a volume between the partition and the top of the case sufficient to receive a laptop computer. Hook and loop fasteners are used to attach the computer to the upper surface of the partition. A stop or stops affixed to the bottom half of the case limit downward movement of the partition when the fasteners are released and the partition is lowered, whereby the computer is disposed substantially above the volume of the lower half of the case when it is in use.

BRIEF DESCRIPTION OF THE DRAWINGS

In the accompanying drawings.

DESCRIPTION OF THE PREFERRED EMBODIMENT

Figure 1:
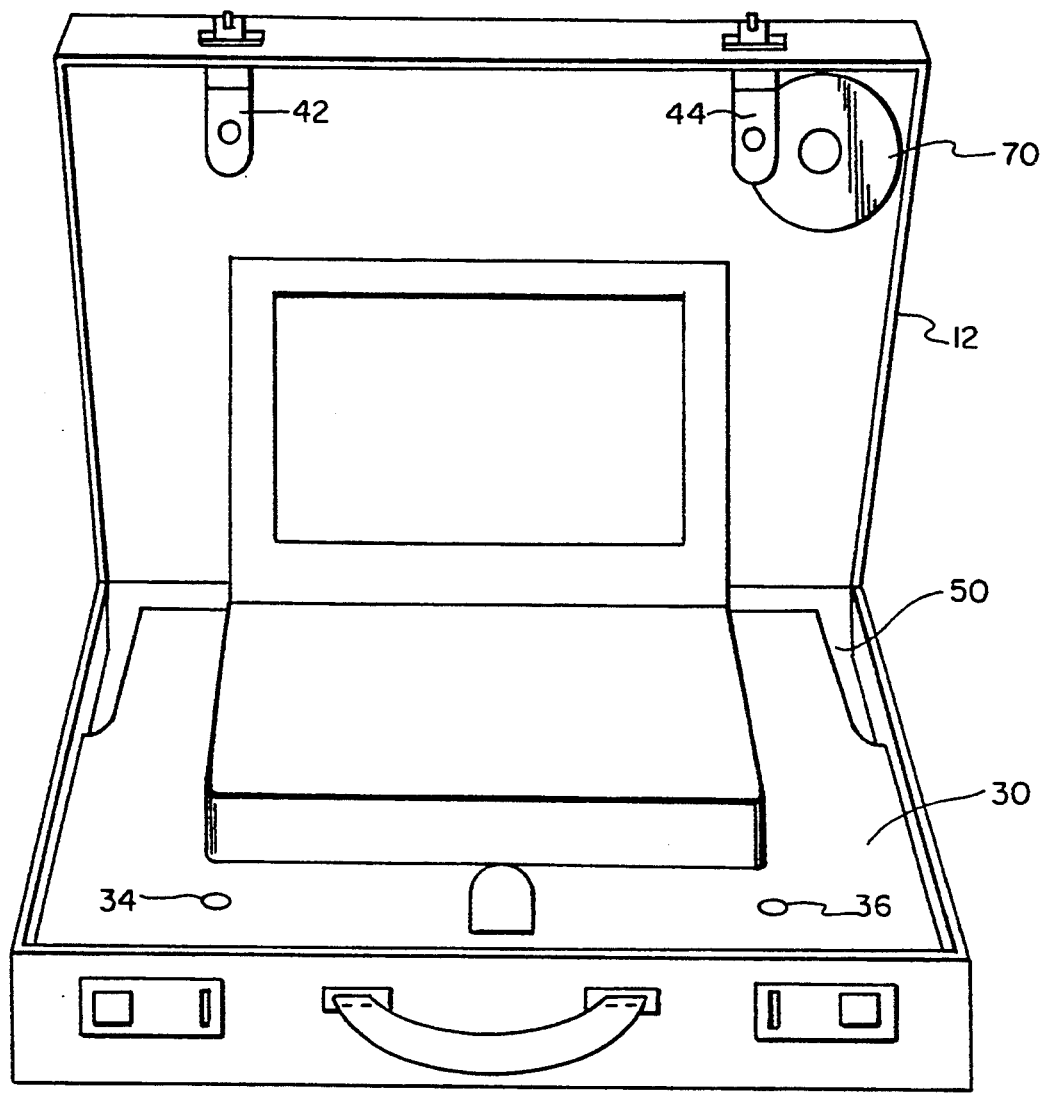
FIG. 1 is a perspective view of an attache case embodying the invention, showing a laptop computer ready fox use.

An attache case embodying the invention includes a bottom half 10 and a top half 12 interconnected by conventional hinges, not shown. The bottom half of the case is provided with a handle 14 on its Front surface, between two sliding combination lock latches 16,18. The latches receive hasps 20,22 hinged to the front side of the top half of the case. Folding braces 24,26 are provided between the halves; these are preferably of a type that can lock in their extended position to hold the case open. Inasmuch as items 14,16,18, 20,22,24 and 26 are conventional, they are not described further.

The exterior of the case is preferably covered with a high grade leather, although the type of material used does not affect the function of the invention. The inside surfaces of the top and bottom halves are lined with a nylon fabric material, but again this is an aesthetic preference.

The lower half of the case may be provided with a partition, if desired, but this is optional, and therefore such a partition is not shown in the drawings.

The partition 30 that is shown in the drawings is associated with the top half of the case. It needs to be, if not completely rigid, at least stiff, so that it will support the weight of the computer without undue distortion, certainly without permanent deformation. The partition preferably includes a reinforcing core of a stiff material such as cardboard, covered with an aesthetically pleasing material, which may be a woven fabric or leather. The material chosen should be capable of being adhered to by common adhesive-backed hook and loop fastener strips.

The partition is permanently connected to the case by a continuous strip hinge 32 made, for example, of leather, which is sewn to the inside rear surface of the case along its length, and to the partition. Alternatively, instead of leather, the hinge may be made of an elastic material such as a strong rubberized fabric, capable of substantial stretching, to allow the partition to move further down in the case when a thick computer is installed.

The partition has a pair of fasteners 34,36 near its free corners engageable by corresponding fasteners 38,40 affixed to the upper half of the case. While a variety of fasteners may prove suitable, I presently prefer to use snap-type fasteners, half of each snap being secured to the bottom side of the partition (the side seen in FIG. 2) and the other half being affixed to a respective flexible leather tab 42,44 secured to the inside front surface of the upper half of the case. The tabs are shown disconnected in FIG. 1, and the reverse sides of the snaps 34,36 are visible on the partition 30.

Figure 2:
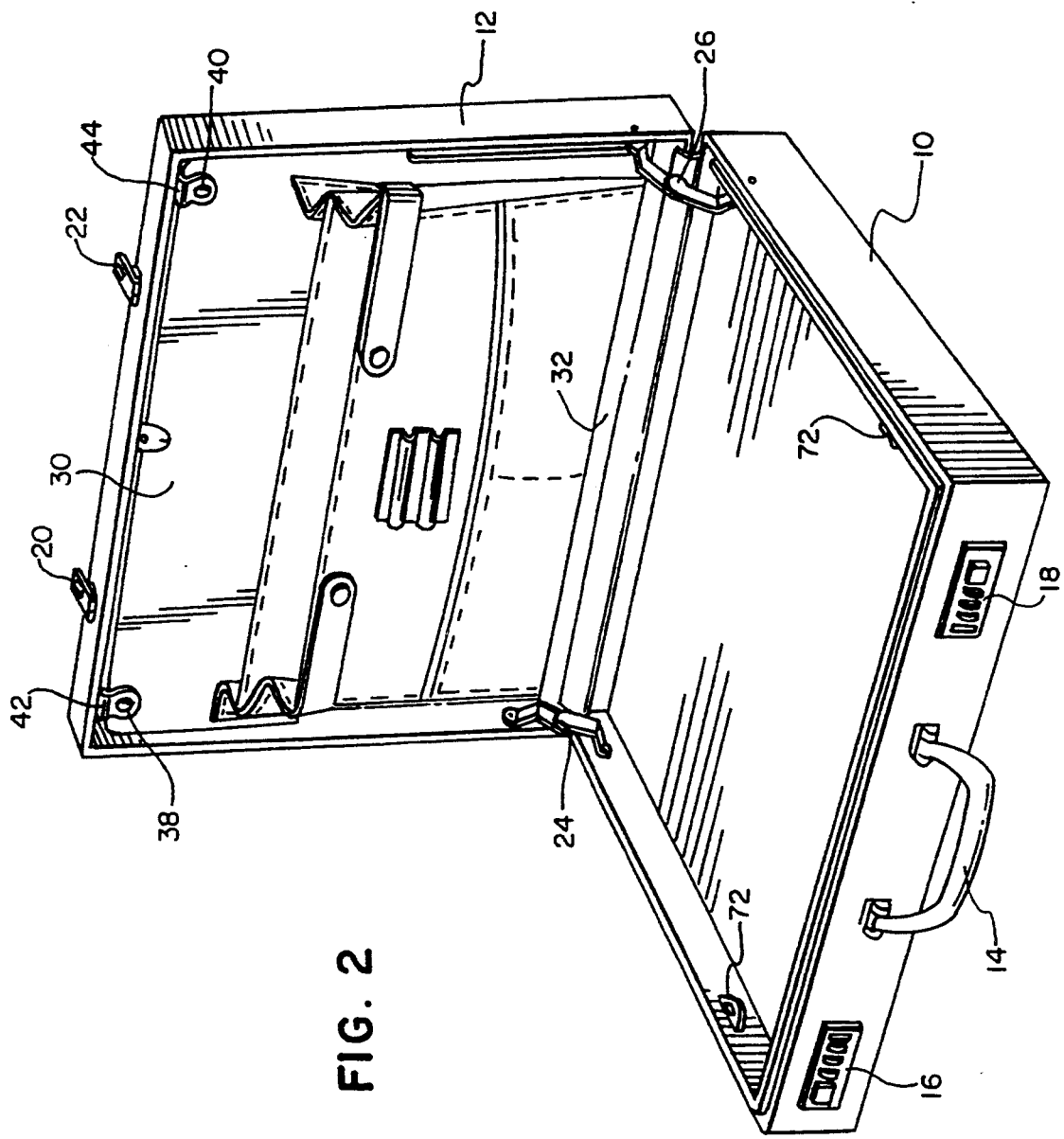
FIG. 2 is a view like FIG. 1, showing the desk lid of the case raised and secured, hiding the computer.

As one can see in FIG. 2, the partition's bottom surface (facing the viewer) is unremarkable, except for some pockets 46,48 for securing papers or other items. Details of these features may vary considerably, and do not affect the invention. Note, however, the side reliefs 50, which are necessary to clear the folding braces 24,26.

The top surface of the partition is substantially flat, so that it will not interfere with installation of the computer, no matter where the computer is placed on the surface.

Figure 3:
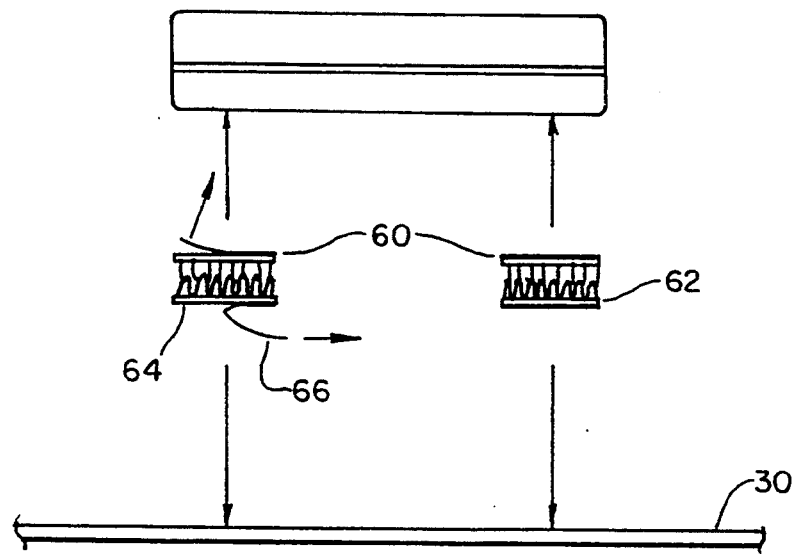
FIG. 3 is an exploded side view, in partial section, of the case and computer, showing how the computer is attached to the case.

To install a computer in the case, one installs the hook and loop fasteners as follows. (See FIG. 3.) The fasteners are installed in assembled mating pairs, that is, a strip of hook material 60 engaged with a like-sized strip of loop material 62. Each exposed outer surface of this sandwich is provided with an adhesive 64 covered by a peel strip 66. One of the peel strips is removed, and the exposed adhesive surface is pressed against the bottom of the computer. Four fasteners, one at each corner of the computer, are presently preferred, but fewer fasteners, even as few as one, may be suitable. Once the fasteners are in place on the bottom of the computer, the remaining peel strips are removed, and the computer is pressed into its final position against the top surface of the partition.

So that the computer can be removed from the case when desired, the adhesive must have a bonding strength, to both the bottom surface of the computer and the top surface of the partition, substantially greater than the separation strength of the fastener. Otherwise, the adhesive bond will fail when the computer is removed. This admonition is made primarily to provide guidance in the selection of appropriate covering materials for the partition surface.

One may also install accessories in a similar manner. FIG. 1, for example, shows a mouse held inside the case by a hook and loop fastener. A wireless mouse 70 is particularly convenient in this environment, particularly if the receiving unit can be incorporated into the computer motherboard, or on an auxiliary board. A wireless mouse is disclosed in U.S. Pat. No. 4,754,268, the disclosure of which is incorporated herein by reference.

When the computer is not needed, it may be concealed and gotten out of the way by raising the partition and fastening it to the top of the case, as shown in FIG. 2. When the computer is needed, the partition is simply lowered. The edges of the partition come to rest on the stops 72, so that the top surface of the partition is about horizontal, and the computer sits well up, above the rim of the bottom of the case, providing good access to the keyboard. And there is no distracting background for the user, since his papers and other paraphernalia are kept in the bottom of the case.

Since the invention is subject to modifications and variations, it is intended that the foregoing description and the accompanying drawings shall be interpreted as illustrative of only one form of the invention, whose scope is to be measured by the following claims.

I claim:

1. An attache case for housing a laptop computer, said case comprising a bottom half and a top half connected to the bottom half by a hinge, and a carrying handle connected to the bottom half,
    a pair of folding braces for limiting opening movement of the top half with respect to the bottom half to about 90°,
    a partition hingedly connected to the upper half of the case along a hinge line spaced at least an inch from the top of the case, thereby defining a volume between the partition and the top of the case sufficient to receive a laptop computer,
    means for removably attaching a computer to the upper surface of the partition,
    manually releasable fasteners for securing the free edge of the partition to the top half of the case, and
    at least two stops affixed to the bottom half of the case for limiting downward movement of the partition when the fasteners are released and the partition is lowered, whereby the computer is disposed substantially above the volume of the lower half of the case when it is in use.

2. The invention of claim 1, wherein said partition is substantially rigid.

3. The invention of claim 1, wherein said partition has a stiffening core.

4. The invention of claim 1, wherein each of said manually releasable fasteners comprises a flexible tab affixed to the upper half of the case, and a snap fastener having two mating portions, one secured to the tab, and one secured to the partition.

5. The invention of claim 1, wherein the means for removably attaching a computer to the upper surface of the partition comprises at least one hook and loop fastener.

6. The invention of claim 1, wherein the partition is connected to the case by an elastic hinge, so that the partition can move down in the case to accommodate computers of different sizes.

7. An attache case containing a laptop computer,
    said case comprising a bottom half and a top half connected to the bottom half by a hinge, and a carrying handle connected to the bottom half,
    a pair of folding braces for limiting opening movement of the top half with respect to the bottom half to about 90°,
    a partition hingedly connected to the upper half of the case along a hinge line spaced at least an inch from the top of the case, thereby defining a volume between the partition and the top of the case sufficient to receive a laptop computer,
    means for removably attaching a computer to the upper surface of the case,
    a laptop computer secured by said means to the upper surface of the case,
    manually releasable fasteners for securing the free edge of the partition to the top half of the case, to conceal the computer when it is not in use, and
    at least one stop affixed to the bottom half of the case for limiting downward movement of the partition when the fasteners are released and the partition is lowered, whereby the computer is disposed substantially above the volume of the lower half of the case when it is in use.

8. The invention of claim 7, further comprising a mouse electrically associated with the computer, and releasable means for attaching the mouse inside the case.

9. The invention of claim 8, wherein the mouse is a wireless mouse.

10. The invention of claim 8, wherein the releasable means for attaching the mouse comprises a hook and loop fastener.

* * * * *